United States Patent [19]

Cornelissen

[11] Patent Number: 4,889,046
[45] Date of Patent: Dec. 26, 1989

[54] DEVICE FOR PEELING ONIONS OR OTHER BULBOUS OR TUBEROUS PLANTS

[75] Inventor: Andreas H. W. M. Cornelissen, Oosterhout, Netherlands

[73] Assignee: Instituut Voor Bewaring en Verwerking Van Landbouwprodukten, Wageningen, Netherlands

[21] Appl. No.: 302,405

[22] Filed: Jan. 26, 1989

[30] Foreign Application Priority Data

Feb. 2, 1988 [NL] Netherlands ............... 8800250

[51] Int. Cl.$^4$ ............... A23N 7/00; A23N 15/08
[52] U.S. Cl. ............... 99/546; 99/516; 99/584; 99/636
[58] Field of Search ............... 99/485, 516, 534–536, 99/537–540, 567, 546, 591, 584–589, 593–595, 574–576, 623–626, 636; 426/482, 483; 86/876, 877, 884

[56] References Cited

U.S. PATENT DOCUMENTS

| | | | |
|---|---|---|---|
| 1,720,468 | 7/1929 | Combest | 99/584 |
| 2,445,881 | 7/1948 | Hemmeter | 99/516 |
| 3,696,848 | 10/1972 | Mellon et al. | 99/516 |
| 4,470,345 | 9/1984 | Miyata | 99/516 |
| 4,476,778 | 10/1984 | Clyma | 99/589 |
| 4,481,875 | 11/1984 | Toyosato | 99/591 |
| 4,602,559 | 7/1986 | Suzuki et al. | 99/636 |
| 4,658,713 | 4/1987 | Nagada | |

FOREIGN PATENT DOCUMENTS

| | | |
|---|---|---|
| 033180 | 8/1981 | European Pat. Off. . |
| 109987 | 6/1984 | European Pat. Off. . |
| 114715 | 8/1984 | European Pat. Off. . |
| 174697 | 3/1986 | European Pat. Off. . |
| 3605639 | 9/1986 | Fed. Rep. of Germany ........ 99/584 |
| 2200775 | 4/1974 | France . |

OTHER PUBLICATIONS

Standard Search Report dated Oct. 21, 1988, for Netherlands Patent Application No. 8800250.

*Primary Examiner*—Timothy F. Simone
*Attorney, Agent, or Firm*—Hopgood, Calimafde, Kalil, Blaustein & Judlowe

[57] ABSTRACT

A peeling machine intended for removing the outer skins of onions or other bulbous or tuberous plants comprising a holder (19) with one or more knives (20) for making a circumferential cut in the onions and at least one nozzle (21) for the infeed of compressed air or an other pressurized medium for removing the peelings. In order to increase the percentage of skins blown away, and to improve the peeling output without damage to the onions the nozzle (21) for the supply of compressed air is fitted in or on the knife holder (19) a short distance away from a knife (20).

6 Claims, 6 Drawing Sheets

DEVICE FOR PEELING ONIONS OR OTHER BULBOUS OR TUBEROUS PLANTS

The invention relates to a device for peeling onions or other bulbous or tuberous plants, comprising a holder with one or more knives for making a circumferential cut in the onions and at least one nozzle for the infeed of compressed air or another pressurized medium for removing the peelings.

Such a device is described in European Patent Application 0,114,715 and French Patent Specification 2,200,775.

Onions which are to be processed into rings, dice and similar pieces are peeled, i.e. the brown skins and the outer fleshy skin are removed and they are topped and tailed. A peeling loss of about 30% is considered acceptable. Onions which are to go through a drying process need not be totally skinned, in other words only the brown skins and the tops and tails need be removed, which means that the peeling loss can be limited to about 10 to 15%. Peeling off the skins and topping and tailing are still carried out by hand. There are cutting machines in which onions inserted on pins are conveyed past rotary knives to cut off the heads and tails. The onions damaged by the pins generally have a reduced shelf life. There are also machines on the market for rubbing off the skins by means of Carborundum-containing elements or for peeling the onions with knives. The treatment with these machines leads to greatly damaged onions and high peeling losses. The peeled product falls far short of the high quality and attractive appearance of onions peeled by hand. Another known method is to subject onions to a caustic solution or steam treatment to loosen the outer skins. Peeling with caustic solution leads to an effluent problem, and the appearance of the peeled product is not so attractive. Steam-peeling has the disadvantage that some of the product bursts if there is sudden expansion of the steam tank and the onions consequently acquire an irregular appearance. There are quite a number of peeling systems which have the object of reducing manual work to a minimum and which lead to too much misproduct (head and tail removed at the wrong place, skin not removed completely, and the like) and too many other disadvantages (including high peeling loss, usable only for a certain size, low capacity of peeled product per person per hour, not so good external quality, limited shelf life, effluent problems and the like). Peeling by hand is, on the other hand, expensive and involves the risk of microbiological contamination. There is therefore a need for a non-manual peeling method for onions which does not have the above-mentioned disadvantages.

The devices according to the above-mentioned Dutch patent application and the above-mentioned French patent specification, which operate on the principle of scoring along a circumferential cut and blowing away the skins, do produce onions with little damage and a low peeling loss, but it is found in practice that the skins to be removed are often not (properly) blown away by the compressed medium.

The object of the invention is to eliminate this disadvantage, and to this end the device mentioned in the preamble is characterized in that the nozzle for the infeed of compressed air is fitted in or on the knife-holder a short distance away from a knife.

It was surprisingly found that through this simple measure a much greater percentage of the skins to be removed is blown away, and the peeling output can be improved considerably without damage to the onions.

If the device has guide means which are known per se for taking the line through head and tail of the onions in a specific direction, the device preferably has two rotary parallel clamping plates for clamping an onion, means for moving the clamping plates towards and away from each other, transfer means for transferring an onion from the guide means to a position between the clamping plates, and means for moving the knife-holder in the direction of a position situated centrally between the clamping plates, and back.

If the knife-holder is provided with an approximately semicircular recess and a number of knives are fitted along the periphery of said recess, the onions can be centred very well between the clamping plates.

The clamping plates can also be used for topping and tailing the onions; in that case they are designed as circular knives.

In order to make the circular knives go in a simple manner into the desired position relative to each other for topping and tailing and also to be able to push the circular knives towards each other for temporary clamping of the onions, they are supported on carriages which are movable along a limited distance on bars, which in turn can be moved by the above-mentioned means for moving the clamping plates away from and towards each other, said carriages being pulled or pushed towards each other by spring means.

The carriages are preferably provided with pilot elements for adjusting the distance between the circular knives to the length of the onions.

All kinds of mechanisms are conceivable for transferring the onions from the guide means to the peeling means. In practice, a very reliable and easily regulated transfer means was found to be one having tongs with two hinged legs, in which control means are present for moving the tongs to the guide means, moving the legs of the tongs towards each other for picking up an onion, pivoting the tongs between the clamping means, moving the legs of the tongs away from each other, and moving the tongs away from the clamping means and returning them to the initial position above the guide means.

The invention will now be explained in greater detail with reference to the Figures, in which an example of an embodiment is shown.

Figure 1:
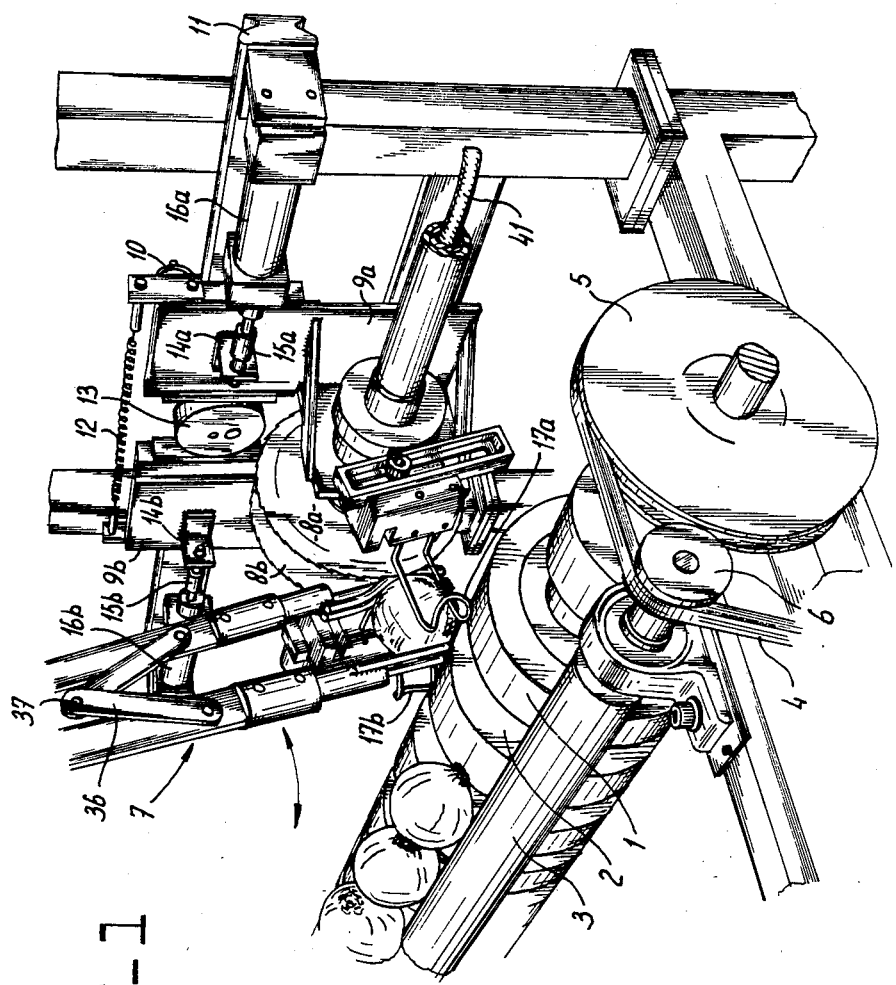
FIG. 1 shows a perspective view of a part of the peeling machine.

The peeling machine shown is intended for removing the outer skins of onions or other bulbous or tuberous plants. The machine comprises a guide mechanism, known per se and disclosed in European Patent Application 0,174,697, which guides onions into a position in which the line through top and tail takes up a certain position, preferably a position in which said line is at right angles to the plane of knives, to be described in greater detail, for topping and tailing. This guide mechanism comprises a roller 1 which has cut into it a spiral groove 2, and a roller 3 which is fitted a short distance away next to the roller 1 and is parallel thereto. These rollers 1 and 3 are driven via a belt 4 and belt pulleys 5, 6 by a motor which is not shown. The peripheral speed of the roller 3 is slightly higher than that of the roller 1. This helps to guide the infed onions in such a way that the line through head and tail of the onions extends in the axial direction of the rollers.

A transfer mechanism 7 of a design yet to be discussed can transfer the guided onions from the guide means to the peeling means.

Said peeling means comprise two circular knives 8a, 8b rotatably mounted on carriages 9a, 9b respectively, which can travel along a fixed rail 11 by means of wheels 10. The carriages are drawn towards other by a spring 12. In order to ensure that the distance between the carriages 9a and 9b, and thus between the knives 8a and 8b, does not fall below a minimum, a spacer 13 is provided between the carriages. Each of the carriages has fixed thereon by means of a bracket 14a, 14b a bar 15a, 15b which can slide freely to and fro along a limited distance. The carriages can be pushed toward each other by means of cylinders 16a, 16b containing a piston to be actuated by compressed air. A pilot pin 17a, 17b is also fixed on each of the carriages. The height of and spacing between these pilot pins are adjustable. Their function is to adjust the distance between the circular knives 8a, 8b to the length of each onion brought in by the mechanism 7 in such a way that the head and tail are cut off at the desired point by the rotary knives. The knives can move freely to and fro along a certain distance by means of the bars 15a, 15b, and they are pushed towards each other only by the power of the spring 12. Once an onion is carried by the mechanism 7 approximately into the centre of the knives 8a, 8b (where it is topped and tailed) a signal is passed to the compressed air supply valve of the cylinders 16a, 16b, and the knives 8a, 8b are pushed towards each other to clamp the onion, which is now in a position for peeling.

Figure 6:
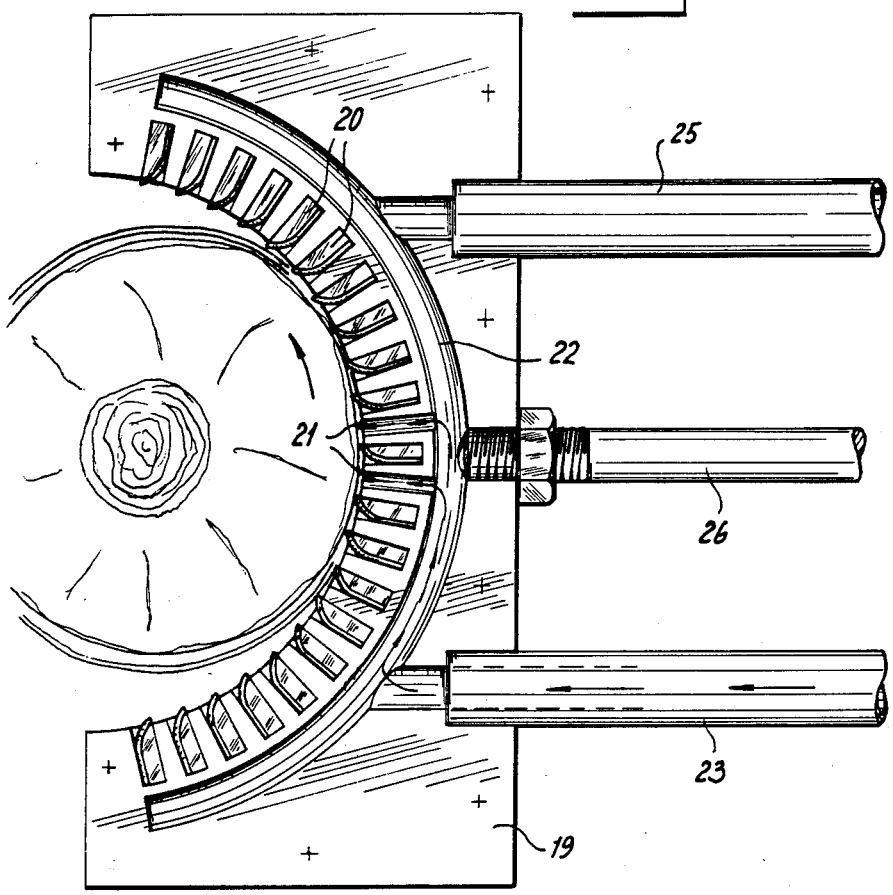
FIG. 6 shows a side view of one half of the knife-holder.
Figure 7:
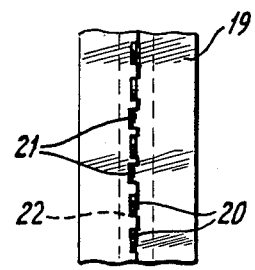
FIG. 7 shows a front view of a part of the knife-holder.

The peeling is carried out by making a circumferential cut in the clamped onion and blowing off the outer skins with compressed air. A knife-holder 19, which can be moved to and fro by a pneumatic cylinder 18 and which is provided with a semi-circular recess on the periphery from which the points of a number of knives 20 project, is used to make the circumferential cut. FIG. 6 shows the open knife-holder 19 with the knives 20.

Figure 5:
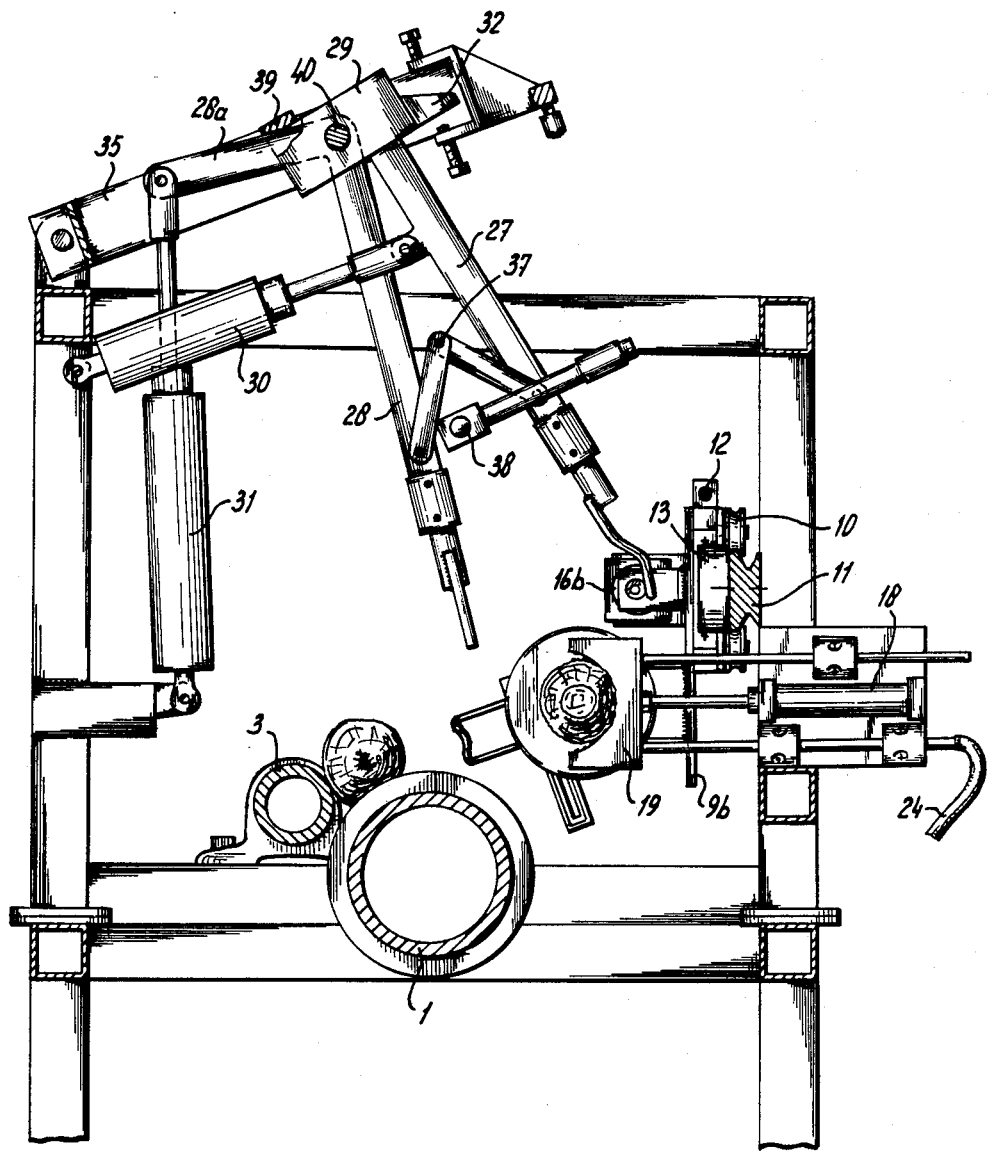

FIG. 5 shows a knife-holder in the cutting position. As a result of the semi-circular shape of the recess boundary, the onion will be centred if the knives 8a, 8b functioning as clamping plates are centred. A circumferential cut with a depth corresponding to the distance along with the knives 20 extend is produced in the onion. For the rotation of one of the knives 8a, 8b use is made of a separate Bowden cable 41 which is connected to a motor (not shown). Telescopic shafts connected to each other by cross couplings can be used instead of a Bowden cable.

It is essential for the invention that one or more nozzles 21, connected to a compressed air source, are disposed in the knife-holder right next to a knife 20. In the example shown there are two nozzles 21 opening into a curved line 22, which is in turn connected to a hollow guide pipe 23 connected to the source by means of a hose 24. The other guide pipe 25 plays no role in the infeed of compressed air. The two pipes 23, 25 project through bushes, and their function is to guide the movement of the knife-holder.

Since the compressed air is always blown directly into the circumferential cut made a very short distance from a knife point, the peeling efficiency is very high. In other words, very much more skin is removed in a very simple manner than in the case of a design in which the nozzles 21 are not incorporated in the knife-holder. The piston rod of the cylinder 18 is indicated by 26.

The transfer means 7 comprise tongs with a front leg 27 and a rear leg 28. The latter pivots relative to a fixed block 29 of the front leg. The pivot point has been given the reference number 40. The front leg 27 can be operated by a cylinder 30, and the rear leg 28 by a cylinder 31.

The block 29 has a lobe 32 which can come into contact with a top stop screw 33 and a bottom stop screw 34. Both screws 33, 34 form part of a hinged arm 35 which is mounted on the frame of the machine, and which is also provided with a stop 39.

Figure 4:
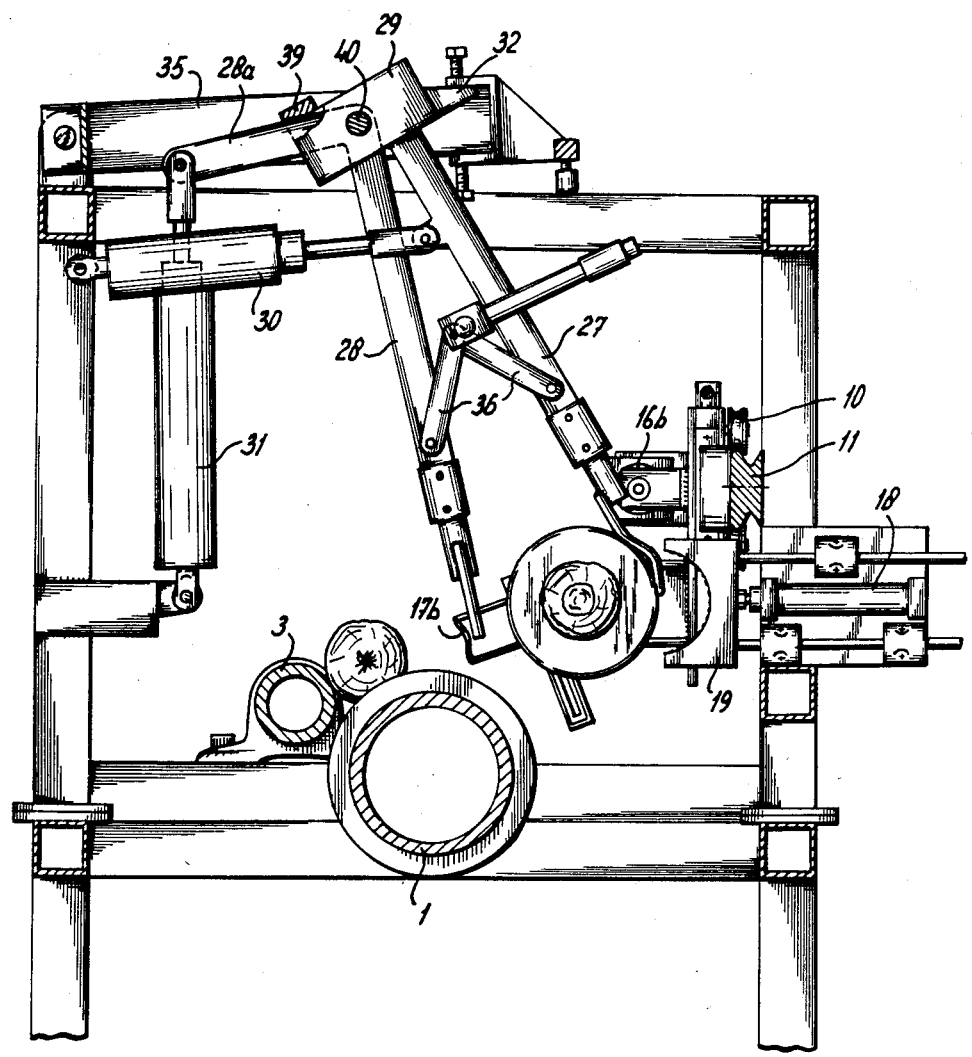

Twin-legged shears 36 are disposed between the legs 27 and 28 of the tongs. The position of the common hinge point 37 of these shears can be established by a sensor 38 when the hinge point 37 passes the sensor head (FIG. 4).

Figure 2:
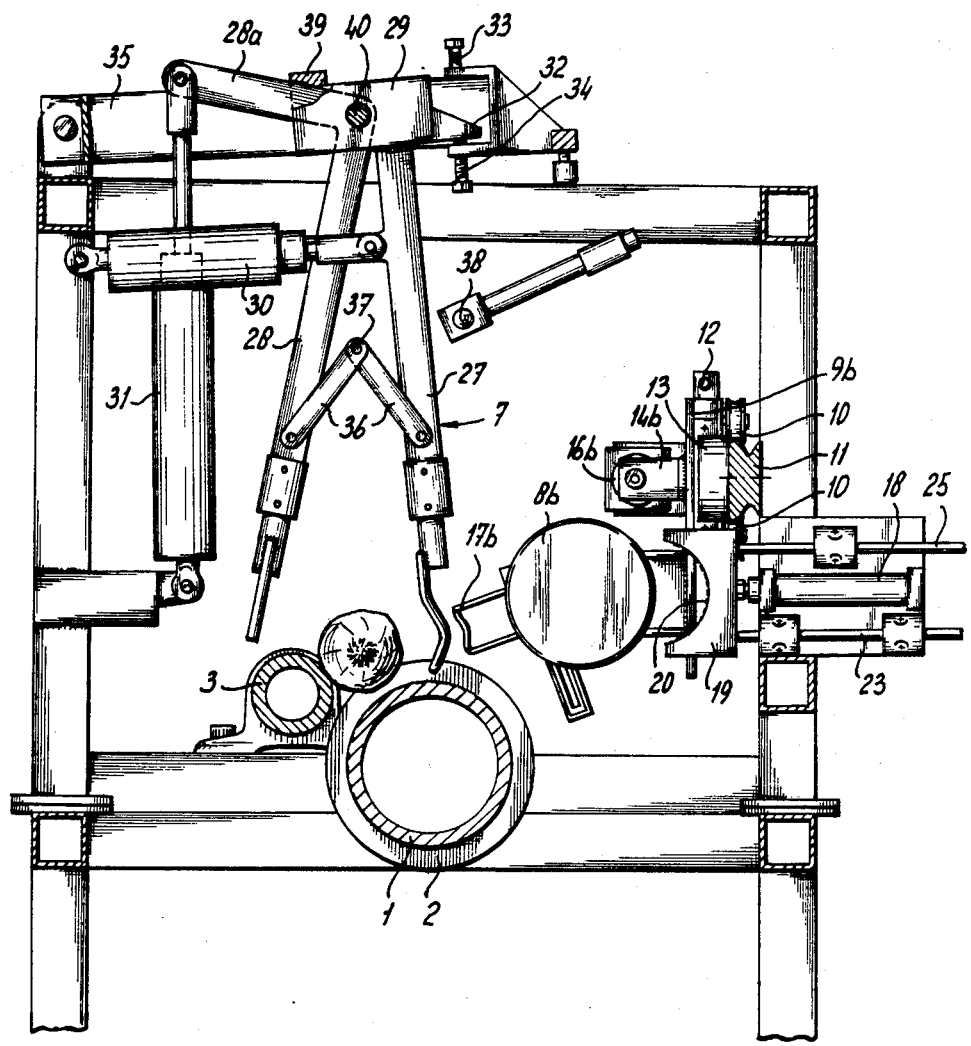
FIGS. 2 to 5 show a cross section of the machine, in which the transfer mechanism for transferring onions from guide means to peeling means takes up different positions.

The transfer mechanism 7 works as follows: In FIG. 2 the tongs 2 are in a low position and are on the point of removing an onion from the guide device 1, 2, 3. In the double-acting air cylinder 30 there is a preliminary pressure of about 2 bars at the bar side. Actuation of the air cylinder 31 causes the leg 28 to move forward, the onion is clamped between the legs 28 and 27 and the two legs with onion are moved forward to the position shown in FIG. 3. During this movement the tops and tails are removed by the knives 8a, 8b.

Figure 3:
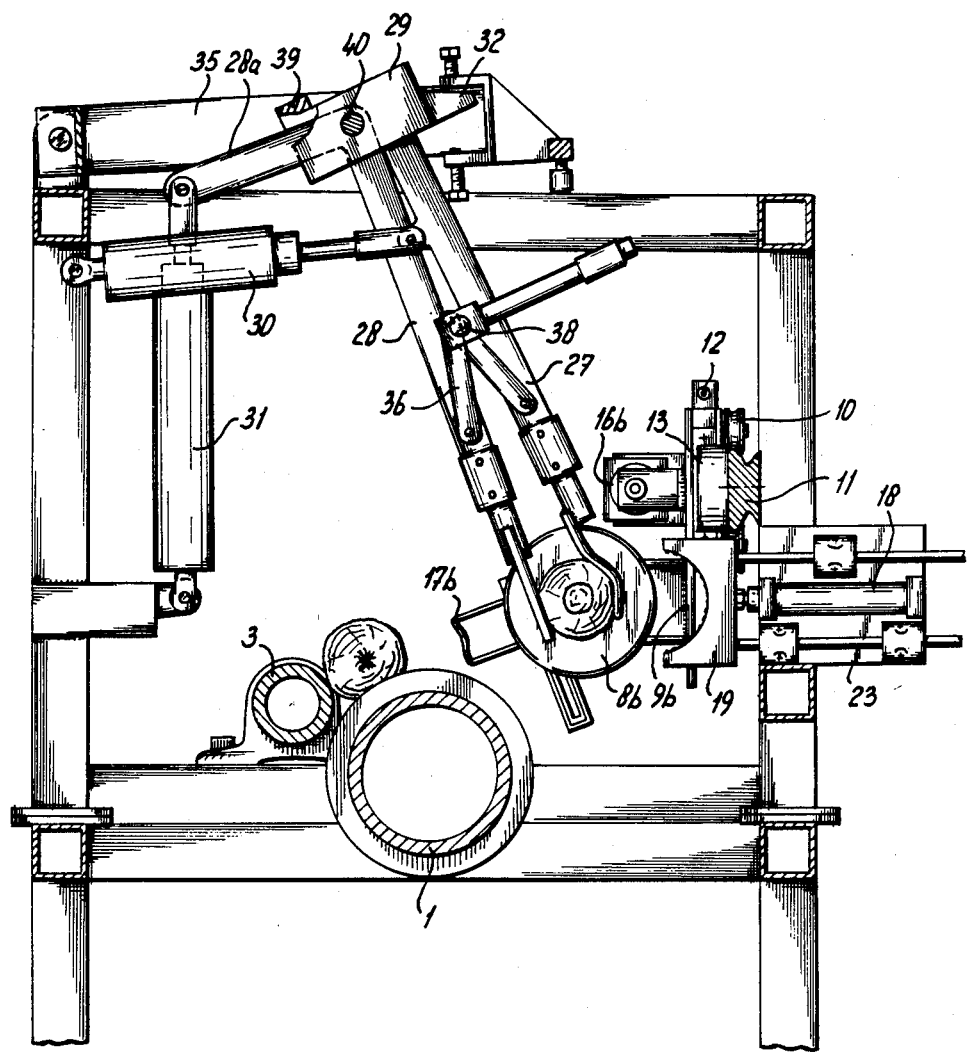

The position of the legs 27, 28 of the tongs shown in FIG. 3 is established by the sensor 38 which reacts to the passing hinge point 37. In this position the onion is in the centre of the knives 8a, 8b. After a signal from the sensor 38 the following actions, partially overlapping each other, are now undertaken:

(1) Compressed air is conveyed to the cylinders 16a, 16b, so that the circular knives 8a, 8b are pushed towards each other and the onion between them is clamped.

(2) The air cylinder 30 is actuated so that the leg 27 of the tongs moves forward until the lobe 32 comes into contact with the stop 33.

(3) Compressed air is conveyed under the piston of the cylinder 31, so that the leg 28 of the tongs pivots away from the leg 27 of the tongs, until the part 28a of the leg 28 comes into contact with the stop 39 on the hinged arm 35 (FIG. 4).

(4) Further movement upwards of the piston of the cylinder 31 causes the entire tongs to be moved upwards to the position shown in FIG. 5. During this movement the piston of the cylinder 30 is blocked and the two legs rotate about the hinge point 40 of the tongs.

Through the respective retraction of the piston rod of the cylinder 30 and the retraction of the piston rod of the cylinder 31, the initial position according to FIG. 2 is achieved, following which the next onion can be picked up and can be subjected to the peeling treatment.

Other mechanisms are also conceivable for transferring the onions from the guide means to the scoring and blowing means. It is greatly preferable for topping and tailing to be carried out while an onion is being moved from the guide means to the peeling means, while the circular knives intended for the purpose also serve as clamping means for clamping the onion in a position in which a score can be made along the circumference of the onion and the loosened skins can be blown away by means of one or more nozzles which are situated in the knife-holder right next to the knives.

I claim:

1. Device for peeling onions or other bulbous or tuberous plants, comprising a knife holder with one or more knives for making a circumferential cut in the onions and at least one nozzle for feeding in compressed air or another pressurized medium for removing the peelings, said nozzle (21) for the supply of compressed air being fitted in the knife-holder (19) a short distance away from a knife (20); guide means for taking the line through head and tail of the onions in a specific direction; two rotary parallel clamping plates (8a, 8b) for clamping an onion, means (16a, 16b) for moving the clamping plates towards and away from each other, transfer means (7) for transferring an onion from the guide means (1, 2, 3) to a position between the clamping plates (8a, 8b), and means for moving the knife-holder (19) in the direction of a position situated centrally between the plates.

2. Device according to claim 1 wherein the knife-holder (19) has an approximately semi-circular recess and a number of knives (20) are fitted along the periphery of said recess.

3. Device according to claim 1, wherein the clamping plates (8a, 8b) are circular knives for removing head and tail of the onions.

4. Device according to claim 3, wherein the circular knives are supported on carriages (9a, 9b) which are movable along a limited distance on bars (15a, 15b) which in turn can be moved by the above-mentioned means (16a, 16b) for moving the clamping plates (8a, 8b) towards and away from each other, said carriages being pulled or pushed towards each other by spring means (12).

5. Device according to claim 4, wherein the carriages are provided with pilot elements (17a, 17b) for adjusting the distance between the circular knives (8a, 8b) to the length of the onions.

6. Device according to claim 1 wherein the transfer means (7) comprise tongs with two hinged legs (27, 28), in which control means (30 to 40) are present for moving the tongs to the guide means, moving the legs towards each other for picking up an onion, pivoting the tongs between the clamping means, moving the legs of the tongs away from each other, and moving the tongs away from the clamping means and returning them to the initial position above the guide means.

* * * * *
* * * * *
* * * * *.